May 16, 1933.    E. H. GREIBACH    1,909,103
PRECISION FREQUENCY SYSTEM
Filed Dec. 31, 1927
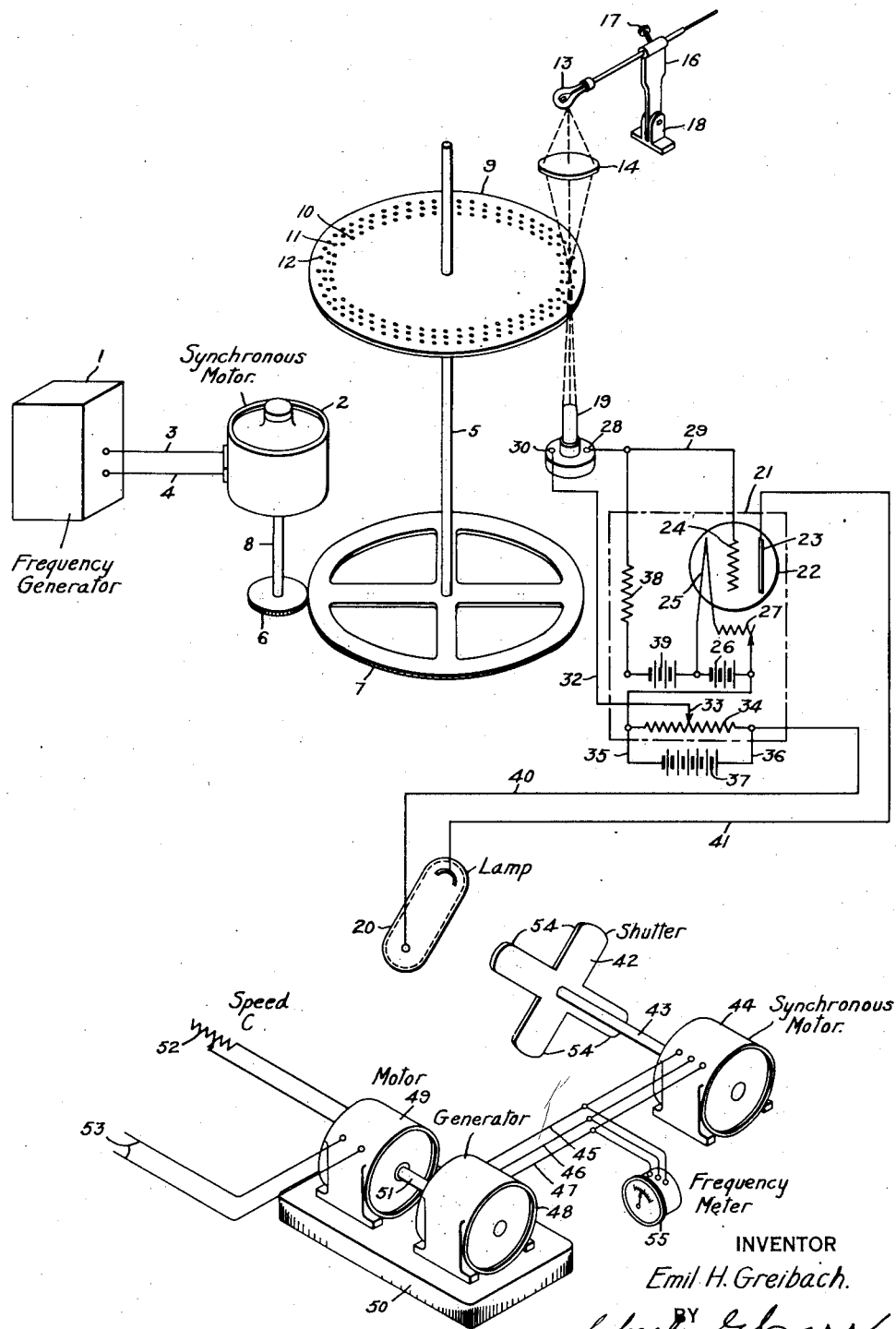
INVENTOR
Emil H. Greibach.
BY
ATTORNEY Patented May 16, 1933

1,909,103

UNITED STATES PATENT OFFICE

EMIL H. GREIBACH, OF PITTSBURGH, PENNSYLVANIA, ASSIGNOR TO WESTINGHOUSE ELECTRIC & MANUFACTURING COMPANY, A CORPORATION OF PENNSYLVANIA

PRECISION FREQUENCY SYSTEM

Application filed December 31, 1927. Serial No. 243,890.

My invention relates to precision frequency systems and more particularly to a precision frequency system wherein a plurality of frequencies may be derived from a frequency generator having a single standard frequency.

My invention relates to apparatus of the above indicated character whereby a plurality of standard predetermined frequencies in an alternating-current circuit may be obtained for the purpose of testing electrical measuring instruments, for example, frequency meters.

Apparatus constructed in accordance with my invention, comprises, in general, a standard frequency generator, means for deriving from said generator a plurality of frequencies differing from said frequency, and means for producing an alternating current having a frequency substantially equal to, or a multiple of any of said different frequencies.

For changing said standard frequency to a slightly different frequency, I utilize a member driven at a constant speed by said frequency generator. Such member is provided with a plurality of rows of equi-spaced openings that permit light rays to operate a light-sensitive relay. Such light-sensitive relay controls the current to, and intermittently lights a lamp that comprises an element of a stroboscopic device. The other portion of the stroboscopic device comprises a shutter driven by a synchronous motor that derives its power from a speed-controlled alternating-current generator.

The alternating-current circuit between the synchronous motor and the generator comprises the circuit in which a predetermined frequency of the alternating current is to be obtained. Such alternating current is utilizable in testing electrical apparatus in connection with frequency, such as frequency meters, as mentioned above.

My invention may be more readily understood and the details thereof may be more easily examined if the accompanying drawing is consulted in connection with the following description.

In the drawing, the single figure is a view, partially diagrammatic and partially in perspective, of a system constructed in accordance with my invention.

Referring to the drawing, a standard-frequency generator 1 supplies power to, by means of conductors 3 and 4, and drives at substantially constant speed, a synchronous motor 2. The synchronous motor 2 drives a shaft 5 through cooperating gear wheels 6 and 7, that are secured, respectively, to a shaft 8 of the synchronous motor 2 and to the shaft 5.

The synchronous motor 2 and the standard frequency generator 1 comprise means for driving the shaft 5 at a standard predetermined constant speed. Any other suitable means for accomplishing the same purpose may, of course, be substituted for the combination of the frequency generator 1 and the synchronous motor 2 without departing from the spirit and scope of my invention.

The shaft 5 is provided with a member 9, for example, a disc in which are cut a plurality of rows 10, 11 and 12 of openings that are disposed circumferentially in concentric circles between the center and the periphery thereof. The openings in each of the rows are distributed in such manner that each row comprises a circle of equally spaced openings. A plurality of interchangeable discs may be provided that have any desirable combination of rows of openings having different numbers of openings in each row.

The number of openings in each row depends upon the frequency change that is desired. For example, assuming that the disc will be driven at one revolution per second, for a frequency of 60 cycles per second, 120 holes may be provided in the row 11. These openings correspond to 120 half cycles. For a slightly higher frequency, for example, 60½ cycles, the row 12 would comprise 121 holes.

A source of light, for example, a lamp 13, is disposed on one side of the disc 9 and its rays are focused through the selected row of the rows 10, 11 and 12 by means of a lens 14. The lamp 13 is adjustably mounted on an arm 15 that is secured to a pivotal member 16 by a thumb piece 17. The pivotal member 16 may be conveniently pivoted on a stationary bracket 18. By means of such mounting, the lamp 13 may be adjusted to take such position that its rays are focused on any one of the rows of openings 10, 11 or 12.

On the other side of the disc 9, a light-sensitive relay, for example, a photo-electric cell 19, is disposed. I prefer to use a photo-electric cell of the character disclosed in the copending application Ser. No. 144,819 of Dewey D. Knowles, filed on or about October 28, 1926, for an improvement in Electric discharge devices and assigned to the assignees of my present application, the Westinghouse Electric and Manufacturing Company.

The photo-electric cell 19 receives as many light impulses per revolution as there are holes in any one row of the disc 9. The photo-electric cell 19, in turn is adapted to light a lamp 20 that is preferably filled with a neon gas. The photo-electric cell 19 may control, and intermittently light, the lamp 20 in any suitable manner as, for example, by means of a thermionic-tube amplifier 21.

The thermionic-tube amplifier 21 comprises a vacuum tube 22 consisting of the usual plate 23, grid 24 and filament 25. The filament 25 is heated, in the usual manner, by a battery 26 in series-circuit relation therewith and an adjustable resistor 27.

One terminal 28 of the photo-electric cell 19 is connected, by a conductor 29, to the grid 24. The other terminal 30 of the photo-electric cell 19 is connected, by a conductor 32, to an adjustable terminal 33 of a resistor 34. The resistor 34 is connected, by conductors 35 and 36, to the terminals of a battery 37. A circuit, comprising a resistor 38 and a grid-biasing battery 39, connected in series circuit relation, is connected between the terminal 28 of the photo-electric cell 19 and the circuit of the filament 25. The positive terminal of the battery 37 is connected, by a conductor 40, to one terminal of a neon lamp 20, and the other terminal of the neon lamp 20 is connected, by conductor 41, to the plate 23 of the vacuum tube 22.

When light is flashed on the photo-electric cell 19, the latter permits current to flow through the resistor 38. This current flow through the resistor 38 changes the potential between the grid 24 and the filament 25. Such a change in the potential between the grid 24 and the filament 25 permits current to flow in the circuit comprising the filament 25, the battery 37, the lamp 20 and the plate 23.

The adjustable terminal 33 or the resistor 34 is so positioned that, when the photo-electric cell 19 is lighted, the lamp 20 is also lighted and, when the photo-electric cell 19 is dark, the lamp 20 is dark. The neon lamp in this manner, produces light impulses in accordance with the desired frequency obtained by adjusting the lamp 13 over the proper row of openings in the disc 9.

A shutter or stroboscopic disc 42 is disposed near the lamp 20 in such manner that the lamp 20 flashes its light on the shutter 42. The shutter is preferably mounted on a shaft 43 of a synchronous motor 44 that is connected in electrical-circuit relation, by means of conductors 45, 46 and 47, to an alternating-current generator 48. The alternating-current generator 48 may be driven in any suitable manner as, for example, by means of a direct-current motor 49 that is mounted on the same base plate 50 with the generator 48 and is coupled thereto by a shaft 51.

The speed of the direct-current motor 49 may be varied in any suitable manner as, for example, by a speed controller, such as a resistor 52, that may be utilized to vary the amount of power admitted to the motor 49 from a direct-current circuit 53. The speed of the alternating current generator 48 is controlled by the speed of the motor 49, which speed is, in turn, controlled by the adjustable resistor 52.

The frequency of the alternating current traversing the conductors 45, 46 and 47 may be made substantially equal to the frequency of the light impulse emanating from the lamp 20 by adjusting the resistor 52 until the shutter 42 appears to be stationary. When the shutter 42 appears to be stationary, the frequency of the alternating current traversing the conductors 45, 46 and 47 is exactly in phase with the frequency of the impulse lighting the lamp 20. The number of sectors 54 in the shutter 42 is preferably equal to the number of poles of the synchronous motor 44.

The generator 48, in addition to supplying power to the synchronous motor 44, may, at the same time, provide power for a frequency meter 55 that is to be calibrated. Any other device that requires a definite predetermined frequency may also be connected to the conductors 45, 46 and 47.

In operation, an alternating current having an exact frequency, such as 60 cycles per second, may be obtained by focusing the lamp 13 over the proper row of openings in the disc 9 and adjusting the speed of the motor 49 by the controller 52 until the motion between the lamp 20 and the shutter 42 appears stationary. The frequency meter 55 may then be calibrated to indicate exactly 60 cycles.

Any predetermined frequency of an alternating current may be obtained with my device. When very small steps between different frequencies are required, the speed of the shaft 5 and the disc 9 are made smaller, and the number of openings in each row are made larger. For example, when steps of 1/10th of a cycle are required, with a standard frequency of 60 cycles per second, the disc 9 is driven at one revolution per 10 seconds and has 1200 openings. For 60 1/10th cycles, then 1201 holes are necessary, in another row of openings, with the same speed of rotation of the disc 9.

It will, of course, be readily understood that the system comprising the neon lamp 20, the shutter 42 and the synchronous motor 44, may be replaced by any means for indicating the frequency difference of two alternating-current systems.

When there is a difference of frequency between the neon lamp and the shutter 42, the latter appears to rotate at a speed proportional to such difference of frequency. The smaller the number of poles of the motor 44, the higher will be the speed of the sectored disc 42, but, at the same time, smaller differences of frequency may be readily observed. However, the highest sensitivity of observation is obtained by using a two-pole motor and by driving the sectored disc 42 by means of gears, whereby the speed of the disc is increased by a ratio of 2 to 1.

A desirable advantage of my system is that only one standard-frequency generator is required, and, from such one standard-frequency generator, any desired frequency can be produced with exactly the same precision as the frequency produced by the standard-frequency generator.

The standard-frequency generator 1 may comprise a tuning fork, a watch movement, a pendulum or a crystal oscillator. All of these frequency generators are capable of delivering a frequency within the desired limit of accuracy of precision of between 1 1/100 to 1 1/1000 of a cycle per second. Such limits of accuracy are required in the calibration of precision frequency meters and, in accordance with my invention, an alternating current may be generated to have a frequency within such limits of accuracy. Any number of such different precise frequencies may be obtained in accordance with my invention, by the use of only one standard-frequency generator.

It will, of course, be understood that my invention is susceptible of various modifications and changes without affecting the spirit and scope thereof, as set forth in the appended claims.

I claim as my invention:

1. The combination with a motor having a fixed speed of rotation and an alternating-current testing circuit separate therefrom, of means for producing in said circuit a plurality of different frequencies of alternating current having the same degree of accuracy as the speed of rotation of said motor, said means including a stroboscope having coacting lamp and shutter elements for comparing the speed of said motor with the frequency of said circuit, means for operating one of the elements of said stroboscope in accordance with different fixed ratios of the speed of said motor, means for operating the other of said stroboscopic elements in accordance with the frequency of the alternating current of said circuit, and means for changing the frequency of the alternating current of said circuit to correspond to the operation of said one stroboscopic element.

2. In combination, a frequency meter to be calibrated, a source of alternating current for energizing said meter, means whereby the frequency of the alternating current applied to said meter may be varied at will, and means for ascertaining the frequency of the alternating current applied to said meter comprising a standard frequency source of alternating current, means for deriving various predetermined frequencies therefrom and cooperative means associated with said first source of alternating current and said derived alternating current for indicating when the frequency of said first source has been adjusted to be identical with one of said predetermined derived frequencies in order that the meter may be accurately calibrated at various frequencies.

3. In combination, a frequency meter to be calibrated, a source of variable frequency alternating current for energizing said meter, means whereby the frequency of the alternating current applied to said meter may be varied at will, means for ascertaining the frequency of the alternating current applied to said meter comprising a standard frequency source of alternating current, means for deriving from said standard source various alternating currents, the frequencies of which bear certain definite ratios to the standard frequency, and means for indicating when the frequency of the variable alternating current has been adjusted to be identical with the frequency of any one of the alternating currents derived from the standard source.

4. In combination, a frequency meter to be calibrated, a source of standard frequency alternating current, means energized thereby, means responsive to said first means for deriving from said standard source various alternating currents, the frequencies of which bear a predetermined definite ratio to the standard frequency, and means for energizing the meter by alternating current of various frequencies equal to the derived frequencies whereby the meter may be accurately calibrated at various frequencies.

In testimony whereof, I have hereunto subscribed my name this 22nd day of December 1927.

EMIL H. GREIBACH.